United States Patent
Kobayashi et al.

(10) Patent No.: US 12,216,014 B2
(45) Date of Patent: Feb. 4, 2025

(54) DEFORMATION MEASURING DEVICE AND DEFORMATION MEASURING METHOD

(71) Applicant: NIPPON TELEGRAPH AND TELEPHONE CORPORATION, Tokyo (JP)

(72) Inventors: Daiki Kobayashi, Tokyo (JP); Kazuaki Watanabe, Tokyo (JP); Masafumi Nakagawa, Tokyo (JP); Atsushi Aratake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 237 days.

(21) Appl. No.: 17/912,099

(22) PCT Filed: Mar. 18, 2020

(86) PCT No.: PCT/JP2020/012105
§ 371 (c)(1),
(2) Date: Sep. 16, 2022

(87) PCT Pub. No.: WO2021/186641
PCT Pub. Date: Sep. 23, 2021

(65) Prior Publication Data
US 2023/0041474 A1 Feb. 9, 2023

(51) Int. Cl.
*G01L 1/22* (2006.01)
*G01B 7/16* (2006.01)
*G01L 5/10* (2020.01)
*G01L 5/102* (2020.01)
*G01M 5/00* (2006.01)
*F16L 11/118* (2006.01)
*H02G 3/04* (2006.01)

(52) U.S. Cl.
CPC .............. *G01L 1/2287* (2013.01); *G01B 7/16* (2013.01); *G01L 5/10* (2013.01); *G01L 5/102* (2013.01); *G01M 5/0058* (2013.01); *F16L 11/118* (2013.01); *G01M 5/0025* (2013.01); *H02G 3/0468* (2013.01)

(58) Field of Classification Search
CPC ......... H02G 3/0468; G01L 5/10; G01L 5/102; G01L 1/2287; G01B 7/16
See application file for complete search history.

(56) References Cited

U.S. PATENT DOCUMENTS

2012/0082569 A1\* 4/2012 Kanomata ............. G01L 9/0002
417/63

FOREIGN PATENT DOCUMENTS

| CN | 106124142 A | \* | 11/2016 | .......... G01M 5/0058 |
| KR | 20040000002 A | \* | 1/2004 | ............... G01L 1/22 |

OTHER PUBLICATIONS

Machine translation of CN 106124142 A (Year: 2016).\*
Machine translation of KR 20040000002 (Year: 2004).\*
(Continued)

*Primary Examiner* — Nathaniel J Kolb

(57) ABSTRACT

A strain measuring device (100) is a strain measuring device (100) for measuring strain on an FEP (10), and includes a viscous body (101) that has a lower rigidity than the FEP (10) and covers an uneven surface of the FEP (10), and a strain gauge (102) that is attached to a portion of a surface of the viscous body (101).

15 Claims, 5 Drawing Sheets

(56) References Cited

OTHER PUBLICATIONS

Furukawa Electric Co., Ltd. "Square Eflex" Furukawa Electric HP [online] Accessed on Jan. 23, 2020, website: https://www.furukawa.co.jp/eflex/square/.
Sokusho Giken Co., Ltd. "Pipe strain meter specifications" literature [online] Accessed on Mar. 13, 2020, website: http://sokusho-giken.co.jp/download/files/spec/sensor/p-strain_spec.pdf.

* cited by examiner

DEFORMATION MEASURING DEVICE AND DEFORMATION MEASURING METHOD

CROSS-REFERENCE TO RELATED APPLICATIONS

This application is a U.S. National Stage Application filed under 35 U.S.C. § 371 claiming priority to International Patent Application No. PCT/JP2020/012105, filed on 18 Mar. 2020, the disclosure of which is hereby incorporated herein by reference in its entirety.

TECHNICAL FIELD

The present disclosure relates to a strain measuring device and a strain measurement method for measuring strain on an FEP (Flexible Electric Pipe).

BACKGROUND ART

Pipes are widely used in buildings, civil engineering, an agricultural field, and the like, and are used as equipment in a state of being attached to a structure or buried under the ground. Recent years have seen an increased number of cases where FEPs are used under the circumstances where low-cost removal of utility poles is promoted. FEPs have excellent characteristics such as having light weight, being difficult to flatten, and being flexible, and are expected to make works for removing utility poles economical (e.g., see NPL 1).

"Strain" is a basic physical quantity in quality control or design of pipes. Conventionally, strain on a pipe is measured by attaching a strain gauge to the pipe and detecting a change in a resistance value (e.g., see NPL 2). Based on measured strain on the pipe, a worker can ascertain bending or the like of the pipe.

CITATION LIST

Non Patent Literature

[NPL 1] "Square EFLEX", Furukawa Electric Co., Ltd., HP, [online], [searched on Mar. 13, 2020], Internet <URL: https://www.furukawa.co.jp/eflex/square/>
[NPL 2] "Pipe strain gauge specification", Sokusho Giken Co., Ltd., [online], [searched on Mar. 13, 2020], Internet <URL: http://sokusho-giken.co.jp/download/files/spec/sensor/p-strain spec.pdf>

SUMMARY OF THE INVENTION

Technical Problem

In some cases, FEPs are used in a bent state, utilizing the flexibility of the FEPs. There are needs for measuring strain on FEPs in such cases in order to ascertain usage state of the FEPs in the ground, for example, a problem of the FEPs buried in the ground warping due to warpage of the ground under a load applied by vehicles or the like on the ground.

However, typical pipes have smooth surfaces, and accordingly, a strain gauge can be attached to the surfaces, but FEPs have uneven surfaces in the form of bellows, and accordingly, a strain gauge cannot be attached to those surfaces. Therefore, when a strain gauge is attached to a raised portion of the surface of an FEP to measure strain on the FEP, the strain gauge does not deform into a curved shape even when the FEP warps, and there is a problem in that a measurement error such as underestimation of the strain occurs.

The present disclosure was made under the above circumstances and has an object of providing a strain measuring device and a strain measurement method with which strain on an FEP can be measured accurately without being underestimated.

Means for Solving the Problem

A strain measuring device according to an embodiment is a strain measuring device for measuring strain on an FEP, and includes: a viscous body that has a lower rigidity than the FEP and covers an uneven surface of the FEP; and a strain gauge that is attached to a portion of a surface of the viscous body.

A strain measurement method according to an embodiment is a strain measurement method for measuring strain on an FEP, and includes: a covering step of covering an uneven surface of the FEP with a viscous body that has a lower rigidity than the FEP; and an attaching step of attaching a strain gauge to a portion of a surface of the viscous body.

Effects of the Invention

According to the present disclosure, it is possible to provide a strain measuring device and a strain measurement method with which strain on an FEP can be measured accurately without being underestimated.

DESCRIPTION OF EMBODIMENTS

The following describes an embodiment of the present invention with reference to the drawings.

<Configuration of Strain Measuring Device>

Figure 1A:
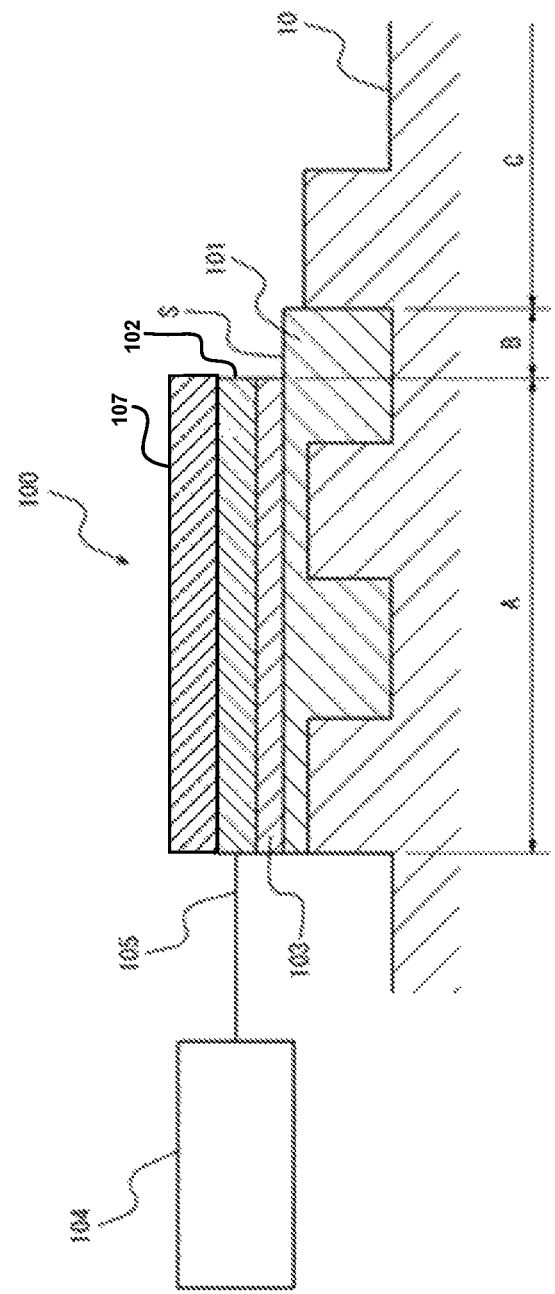
FIG. 1A is a side view showing an example of a configuration of a strain measuring device according to an embodiment.
Figure 1B:
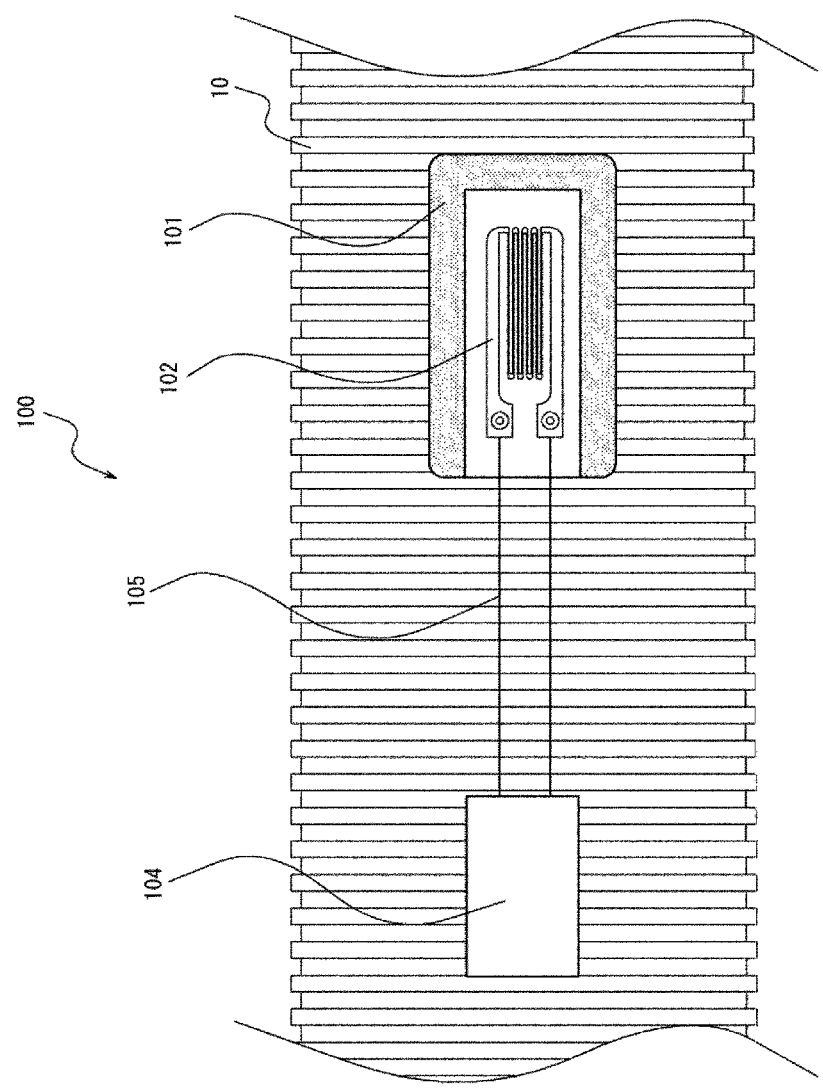
FIG. 1B is a plan view showing an example of the configuration of the strain measuring device according to an embodiment.
Figure 1C:
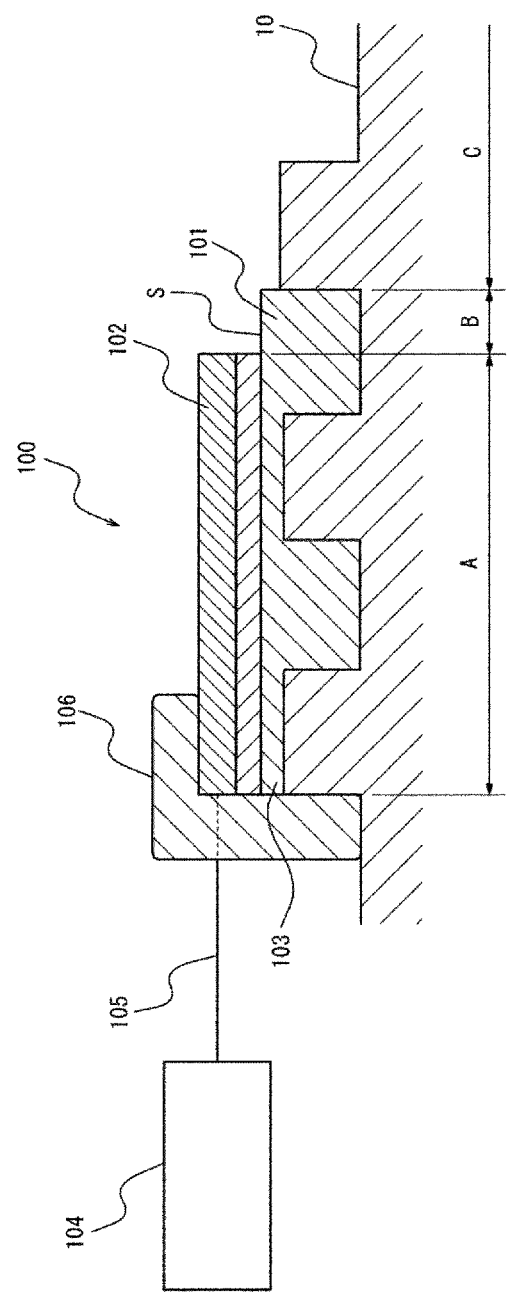
FIG. 1C is a side view showing an example of the configuration of the strain measuring device according to an embodiment.

A configuration of a strain measuring device 100 according to the present embodiment will be described with reference to FIGS. 1A to 1C. FIG. 1A is a side view showing an example of the configuration of the strain measuring device 100. FIG. 1B is a plan view showing an example of the configuration of the strain measuring device 100. FIG. 1C is a side view showing an example of the configuration of the strain measuring device 100.

The strain measuring device 100 is a device for measuring strain on an FEP 10 that has an uneven surface in the form of bellows. The strain measuring device 100 includes a viscous body 101, a strain gauge 102, an adhesive portion 103, a measuring instrument 104, and a lead wire 105.

The viscous body 101 is provided so as to cover the uneven surface of the FEP 10. The viscous body 101 is formed of a protective coating material for strain gauges, for example.

For example, the following document can be referred to for details of the protective coating material for strain gauges.

"AK22: Covering Material for Strain Gauges", Spectris Co., Ltd., HBM, [online], [searched on Mar. 13, 2020], Internet <URL:https://www.hbm.com/jp/3079/ak22-tough-kneadable-putty/>

It is preferable that the rigidity of the viscous body 101 is lower than the rigidity of the FEP 10 so that the viscous body 101 will not hinder extension and contraction of the FEP 10. For example, when it is assumed that the strain measuring device 100 measures strain on the FEP 10 that is buried in the ground, a load applied by vehicles or the like on the ground propagates while spreading in the ground, and the FEP 10 receives warpage of the ground with its surface. When a load propagates in such a manner, if the rigidity of the viscous body 101 is lower than the rigidity of the FEP 10, the viscous body 101 deforms conforming to warpage of the FEP 10. That is, the viscous body 101 can deform into a curved shape conforming to warpage of the FEP 10.

The material of the viscous body 101 is not particularly limited, but it is preferable to select the material as appropriate giving consideration to affinity with materials used for the FEP 10 and the adhesive portion 103 because the viscous body 101 is in contact with the FEP 10 and the adhesive portion 103.

The strain gauge 102 is a known strain gauge for plastics, for example. The strain gauge 102 can have a known configuration such as that disclosed in NPL 2, for example.

The strain gauge 102 is bonded to the viscous body 101 via the adhesive portion 103 and is attached to a portion of a surface S of the viscous body 101. The strain gauge 102 detects a change in a resistance value of a resistor and outputs detection data to the measuring instrument 104 via the lead wire 105.

As described above, the viscous body 101 can deform into a curved shape conforming to warpage of the FEP 10 because the rigidity of the viscous body 101 is lower than the rigidity of the FEP 10. Similarly to the viscous body 101, the strain gauge 102 attached to a portion of the surface of the viscous body 101 can also deform into a curved shape conforming to warpage of the FEP 10. That is, the strain gauge 102 can be deformed into a curved shape so as to conform to the warpage of the FEP 10, and therefore, it is possible to realize the strain measuring device 100 that can measure strain on the FEP 10 accurately without underestimating the strain.

As a result of the strain gauge 102 being attached to a portion of the surface S of the viscous body 101, the following three regions are formed: a region A in which the FEP 10, the viscous body 101, the adhesive portion 103, and the strain gauge 102 overlap each other; a region B in which the FEP 10 and the viscous body 101 overlap each other; and a region C in which only the FEP 10 is present (see FIG. 1A). That is, the viscous body 101 is provided such that a region in which the viscous body 101 covers the uneven surface of the FEP 10 is wider than a region in which the viscous body 101 and the strain gauge 102 are bonded to each other, and therefore, the strain gauge 102 can precisely detect strain on the viscous body 101 conforming to warpage of the FEP 10.

The adhesive portion 103 bonds the viscous body 101 and the strain gauge 102 to each other. The adhesive portion 103 may be a cyanoacrylate-based instantaneous adhesive, for example. The material of the adhesive portion 103 is not particularly limited, but it is preferable to select the material as appropriate giving consideration to affinity with the material used for the viscous body 101 because the adhesive portion 103 is in contact with the viscous body 101.

The measuring instrument 104 is connected to the strain gauge 102 via the lead wire 105. The measuring instrument 104 measures strain on the FEP 10 based on detection data that is input from the strain gauge 102. There is no limitation to the configuration in which the measuring instrument 104 is connected to the strain gauge 102 by the wire, and a configuration is also possible in which the measuring instrument 104 is wirelessly connected to the strain gauge 102.

The measuring instrument 104 may have a function of storing detection data, measurement data, or the like. A configuration is also possible in which the measuring instrument 104 automatically measures strain on the FEP 10 at a predetermined cycle.

Constitutional elements of the strain measuring device 100 are not limited to the constitutional elements described above. Depending on the environment in which the strain measuring device 100 is used, the strain measuring device 100 may further include a waterproof tape 107 that is attached onto the strain gauge 102, for example. Thus, the strain gauge 102 can be protected.

Alternatively, as shown in FIG. 1C, the strain measuring device 100 may further include a protective portion 106 that is provided at a boundary portion between the strain gauge 102 and the lead wire 105 and protects the lead wire 105. The protective portion 106 is formed of clay, for example. The material of the protective portion 106 is not particularly limited, but the protective portion 106 is preferably formed of the same material as the viscous body 101. By providing the protective portion 106 at the boundary portion between the strain gauge 102 and the lead wire 105, it is possible to suppress bending of the lead wire 105 at the boundary portion.

The strain measuring device 100 according to the present embodiment includes at least the viscous body 101 that has a lower rigidity than the FEP 10 and covers the uneven surface of the FEP 10, and the strain gauge 102 that is attached to a portion of the surface S of the viscous body 101. Therefore, it is possible to accurately measure strain on the FEP 10 without underestimating the strain.

<Strain Measurement Method>

Figure 2:
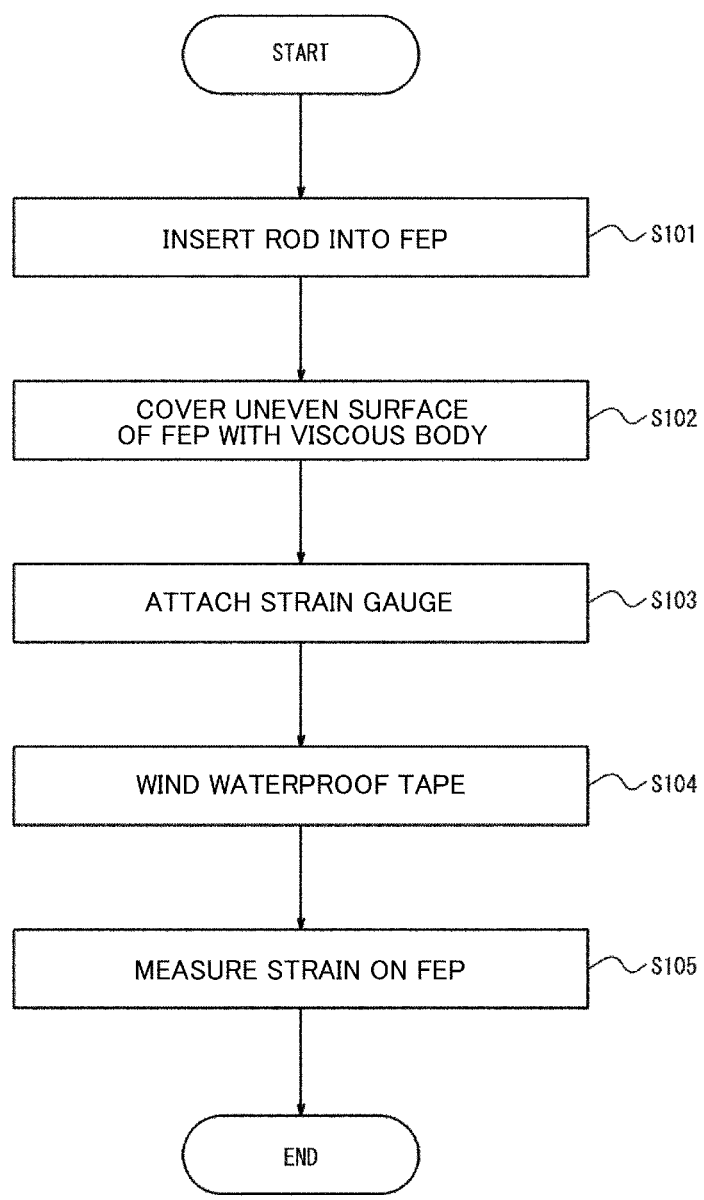
FIG. 2 is a flowchart showing an example of a strain measurement method according to an embodiment.

Next, a strain measurement method according to the present embodiment will be described with reference to FIGS. 2 and 3.

Figure 3:
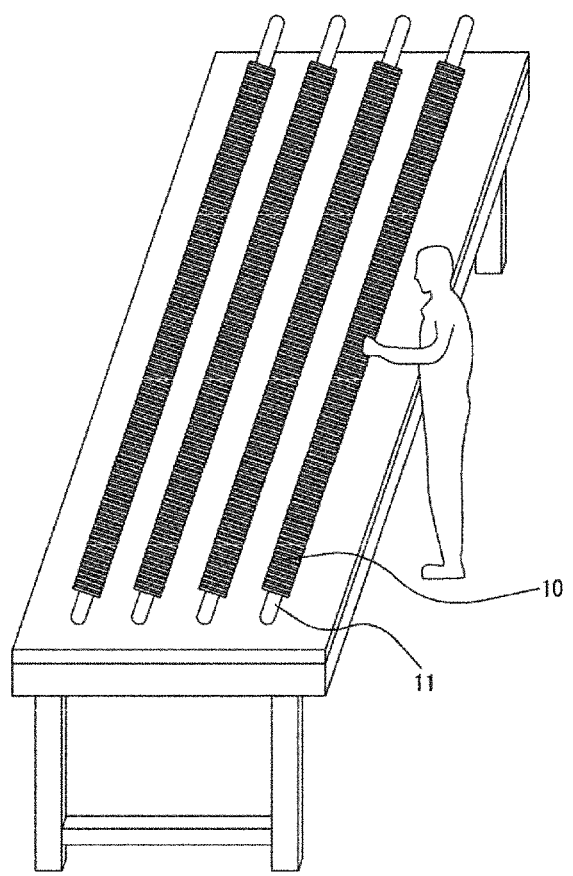
FIG. 3 is a schematic diagram showing an example of the strain measurement method according to an embodiment.

In step S101, a worker inserts a rod 11 into the FEP 10 (see FIG. 3). The FEP 10 may not be straight due to curling when shipped from a factory, for example. Therefore, the worker makes the FEP 10 straight by inserting the rod 11 into the FEP 10 to remove curl or the like from the FEP 10. When the FEP 10 is straight, the worker may omit step S101.

In step S102, the worker applies the viscous body 101 so as to cover the uneven surface of the FEP 10 at a position on the FEP 10 at which the worker wants to measure strain.

In step S103, the worker attaches the strain gauge 102 to a portion of the surface S of the viscous body 101 using the adhesive portion 103.

In step S104, the worker attaches a waterproof tape 107 onto the strain gauge 102. When it is determined that the waterproof tape 107 is unnecessary, the worker may omit step S104.

In step S105, the worker measures strain on the FEP 10 using the measuring instrument 104.

The strain measurement method according to the present embodiment includes at least a step of covering the uneven surface of the FEP 10 with the viscous body 101 having a lower rigidity than the FEP 10, and a step of attaching the strain gauge 102 to a portion of the surface S of the viscous body 101. Therefore, it is possible to accurately measure strain on the FEP 10 without underestimating the strain.

It should be noted that in measurement in which deformation of the FEP 10 is large, the viscous body 101 largely deforms conforming to the deformation of the FEP 10, and a measurement error may occur due to a swelling, a depression, or the like of the viscous body 101. Accordingly, in the measurement in which deformation of the FEP 10 is large, it is preferable that the worker executes the steps described above giving due consideration to various conditions such as selection of the materials of the viscous body 101 and the adhesive portion 103.

Although the above embodiment is described as a representative example, it is clear for those skilled in the art that many changes and replacement can be carried out within the gist and the scope of the present disclosure. Therefore, the present invention should not be construed as being limited by the embodiment described above, and various variations and changes can be made without departing from the claims. Also, a plurality of steps shown in the flowchart of the embodiment may be combined into a single step, or a single step may be divided.

REFERENCE SIGNS LIST

10 FEP
11 Rod
20 Wall surface
100 Strain measuring device
101 Viscous body
102 Strain gauge
103 Adhesive portion
104 Measuring instrument
105 Lead wire
106 Protective portion

The invention claimed is:

1. A strain measuring device for measuring strain on a flexible electric pipe, the device comprising:
   a viscous body that has a lower rigidity than the flexible electric pipe and covers an uneven surface of the flexible electric pipe; and
   a strain gauge that is attached to a portion of a surface of the viscous body.

2. The strain measuring device according to claim 1, further comprising:
   an adhesive portion configured to bond the viscous body and the strain gauge to each other.

3. The strain measuring device according to claim 2, further comprising:
   a waterproof tape that is attached onto the strain gauge.

4. The strain measuring device according to claim 2, further comprising:
   a protective portion that is provided at a boundary portion between the strain gauge and a lead wire.

5. The strain measuring device according to claim 1, further comprising:
   a waterproof tape that is attached onto the strain gauge.

6. The strain measuring device according to claim 5, further comprising:
   a protective portion that is provided at a boundary portion between the strain gauge and a lead wire.

7. The strain measuring device according to claim 1, further comprising:
   a protective portion that is provided at a boundary portion between the strain gauge and a lead wire.

8. A strain measurement method for measuring strain on a flexible electric pipe, the device comprising:
   covering an uneven surface of the flexible electric pipe with a viscous body that has a lower rigidity than the flexible electric pipe; and
   attaching a strain gauge to a portion of a surface of the viscous body.

9. The strain measurement method according to claim 8, further comprising:
   attaching a waterproof tape onto the strain gauge.

10. The strain measurement method according to claim 9, further comprising:
    inserting a rod into the flexible electric pipe before the covering the uneven surface.

11. The strain measurement method according to claim 8, further comprising:
    inserting a rod into the flexible electric pipe before the covering the uneven surface.

12. The strain measurement method according to claim 8, further comprising:
    bonding the viscous body and the strain gauge to each other using an adhesive portion.

13. The strain measurement method according to claim 12, further comprising:
    inserting a boundary portion between the strain gauge and a lead wire using a protective portion.

14. The strain measurement method according to claim 12, further comprising:
    attaching a waterproof tape onto the strain gauge.

15. The strain measurement method according to claim 8, further comprising:
    inserting a boundary portion between the strain gauge and a lead wire using a protective portion.

* * * * *